United States Patent [19]

Bernardot

[11] Patent Number: 4,679,828
[45] Date of Patent: Jul. 14, 1987

[54] CONNECTING DEVICE FOR PIPINGS, PIPES AND CONDUITS

[75] Inventor: Christian Bernardot, Plaisir, France

[73] Assignee: Permaswage S.A., Les Clayes-Sous-Bois, France

[21] Appl. No.: 817,776

[22] PCT Filed: Feb. 10, 1982

[86] PCT No.: PCT/FR82/00026

§ 371 Date: Sep. 28, 1982

§ 102(e) Date: Sep. 28, 1982

[87] PCT Pub. No.: WO82/02755

PCT Pub. Date: Aug. 19, 1982

Related U.S. Application Data

[63] Continuation of Ser. No. 433,128, Sep. 28, 1982, abandoned.

[30] Foreign Application Priority Data

Feb. 11, 1981 [FR] France ................................ 81 02694

[51] Int. Cl.4 .............................................. F16L 55/00
[52] U.S. Cl. .................................. 285/175; 285/334.1; 285/382.2; 285/422
[58] Field of Search .................. 285/334.1, 382.2, 422, 285/329, 378, 916, 175, 256

[56] References Cited

U.S. PATENT DOCUMENTS 1,076,921 10/1913 Stafford .......................... 285/422 X
1,320,503 11/1919 Smith ........................... 285/DIG. 17
1,577,591 3/1926 Rieger .......................... 285/DIG. 17
1,797,691 3/1931 Merrill ............................ 285/382.2
2,017,362 10/1935 Werder ....................... 285/334.1 X
2,187,503 1/1940 Sheridan ..................... 285/382.2 X
2,215,930 9/1940 Mahla ............................. 285/916 X
2,489,890 11/1949 Hufferd .............................. 285/256
3,056,616 4/1962 Jaros .
3,442,537 1/1966 Courtot .
3,467,414 9/1969 Downing .......................... 285/382.2
4,231,596 11/1980 Ridenour ......................... 285/382.2

FOREIGN PATENT DOCUMENTS 2045376 10/1980 United Kingdom ............. 285/334.1
764329 11/1981 United Kingdom .

Primary Examiner—Dave W. Arola
Attorney, Agent, or Firm—Browdy and Neimark

[57] ABSTRACT

A crimping connection comprising an unthreaded sleeve having a tail section joined to a head section. The tail section includes a malleable portion which is adapted to be crimped onto the outer periphery of a pipe and the head section includes a portion of higher hardness than the malleable portion which is adapted to be removably attached within a pipe.

7 Claims, 8 Drawing Figures

CONNECTING DEVICE FOR PIPINGS, PIPES AND CONDUITS

This application is a continuation of application Ser. No. 433,128, filed 9-28-82, now abandoned.

Connecting systems in the field of pipings, pipes and conduits are known, consisting substantially of a connection in form of a sleeve serving to connect two pipe portions brought into alignment with one another. The sleeve is applied onto both facing pipe ends by means of a crimping tool. In this way, zones of the sleeve provided on the outside of the sleeve are radially crimped into the pipe ends by tool dies thereby obtaining a permanent metal to metal joint.

A connection of this type for proper functioning must have an elastic limit lower than that of the pipes to which it is crimped on.

Dismountable connecting devices implemented on fluid conduits comprising a nut (1) are also known. A connecting device of this type sometimes requires high tightening torques to provide proper sealing, under severe operative conditions (for example, high pressure, vibrations, thermal dilation, and so on), thereby leading to the selection of minimally deformable and, therefore, hard materials for the various constitutive elements of such device.

The sealing of those connecting devices is generally ensured by the contacting of a spherical, toroidal or conical male element (2) within a conical female element (3), the most currently used angles being 24°, 45°, 60°, 80°, 90°, (refer to FIG. 1 of the attached drawings).

The present invention is intended for providing a connecting device capable of fulfilling both the role of a malleable crimping connection and the role of a dismountable male connecting device.

However, for realizing a device of this type, one has to meet with an incompatibility caused by the fact that the hardness required for dismountable connecting is too high for the malleable connection, or that malleability required for the malleable connection leads to too high a deformation of the dismountable connection.

The present invention conciliates the required hardness and the required malleability by developing in a zone of an unthreaded connection sleeve an adventitious portion of a different nature, harder when such adventitious portion is intended for realizing a dismountable connecting male portion (the other connection portion then remaining a malleable crimping portion); more malleable when such adventitious portion is intended for realizing a crimping connection portion (the other connection portion remaining a dismountable hard connecting portion), hence two possible simultaneous functions, of dimountable connecting and of crimped connection, for one and the same accessory according to the invention.

According to the invention it is intended to develop such a harder adventitious portion on the malleable accessory, at the beginning by several processes, either metallurgical or mechanical processes.

According to one mode of manufacturing, the harder adventitious portion is produced by localized machining hardening.

According to another mode of realization the harder adventitious portion is produced by adding a part thereto such that the malleable sleeve may form a continuous assembly with the added member.

According to the invention, it is intended to develop such a more malleable adventitious portion, on the accessory, which is hard at the beginning, through localized overquenching, which lowers the elastic limit in the zone of the accessory which is then considered.

Other characteristics and advantages of the present invention will appear from the following description which is made with reference to the attached drawings on which:

Figure 1:
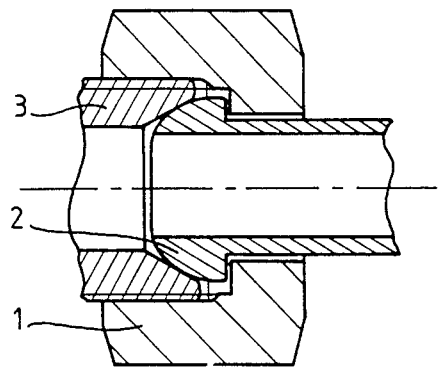
FIG. 1 represents a cross-section through a dismountable connecting device with a nut of the known type.
Figure 2:
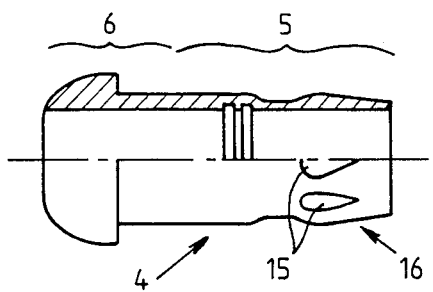
FIG. 2 represents in a half-cross-sectional view an accessory according to the invention to show a malleable portion as required for the crimped connecting and a harder adventitious portion as required for the intended dismountable connecting.

There is shown in FIG. 2 an accessory (4) according to the invention, comprising a malleable crimping portion (5) in a tail section of the sleeve and a harder dismountable adventitious connecting portion (6) in a head portion of the sleeve, note that the head section has a larger diameter than the tail section.

According to one aspect of the invention, it is intended to make up the accessory by the assembly of two complete parts with one constituting the dismountable connecting portion of a hard material and the other the malleable crimping portion.

The hard material may be a steel of the stainless type structurally hardened in the aged condition (for example, Z6NCT25), and the malleable material may be a steel of the stainless type, austenitic in the overquenched condition (for example, AISI 316L).

The technologies resorted to by the invention for assembling these two parts together do not modify the characteristics of the materials at hand or can only modify them very locally.

Figure 3:
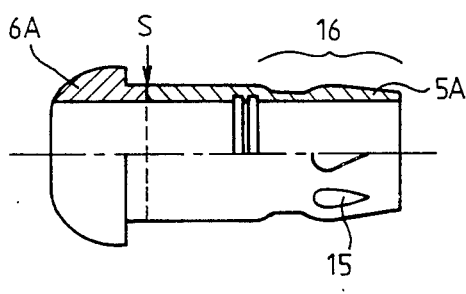
FIG. 3 is a half cross-sectional view of an accessory according to the invention in which a hard adventitious portion is associated with a malleable crimping portion.

In the form of embodiment in FIG. 3 the portion or part of hard material (6A) is assembled along a line (5) to the portion or part of malleable material (5A) through an operation of end to end welding through electronic bombardment.

Figure 4:
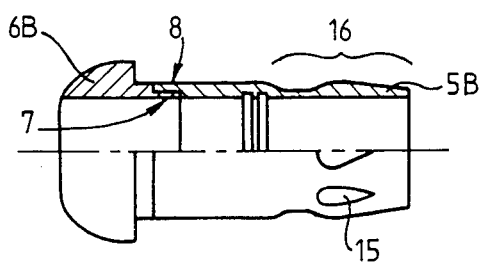
FIG. 4 is a half cross-sectional view of an accessory according to the invention which is made by assembling a hard portion and a malleable portion.

In the form of embodiment shown in FIG. 4, the assembly of a complete portion or part of hard material (6B) to a complete portion or part of malleable material (5B) is produced through the assembling thereof by brazing, glueing, hooping or any other operation to permit the bonding together of both parts, the hooping being produced, e.g. through press assembling or thermally.

For the realization of a suitable assembly both portion (6B) and portion (5B) are formed with complementary assembling collars (7 and 8).

Figure 5:
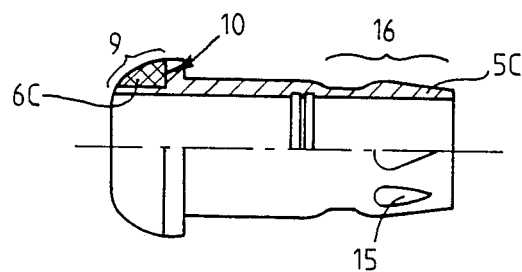
FIG. 5 is a half cross-sectional view in which an added portion constitutes the hard portion of the accessory according to the invention.

In the form of embodiment shown in FIG. 5 the added portion or part of hard material is limited to a reamed spherical segment (6C) which forms by its lateral convex surface (9) the required sealing zone for the realization of a dismountable connecting.

The segment (6C) is received in an annular groove (10) outwardly formed in the malleable portion or part (5C) which extends thereto.

It is considered according to the invention to provide the assembly of portions (6C) and (5C) by end to end welding through electronic bombardment; by brazing, glueing, hooping or any other operation to permit the bonding together of both parts.

Figure 6:
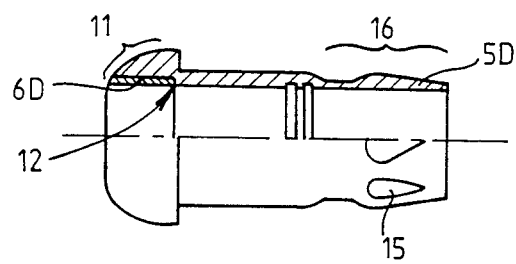
FIG. 6 is a half cross-sectional view of an accessory according to the invention which comprises a hard reinforcing means.

In the form of embodiment shown in FIG. 6 a simple inner reinforcing means in form of a ring (6D) of a hard material limits deformation of a sealing zone (11) made integrally with the malleable crimping portion (5D) which extends thereto. Such reinforcing ring can be assembled according to the invention by welding through electronic bombardment, brazing, glueing, hooping or any other operation to permit the bonding of both parts together.

The reinforcing ring (6D) is received in an annular groove (12) inwardly provided in the malleable portion of part (5D).

Figure 7:
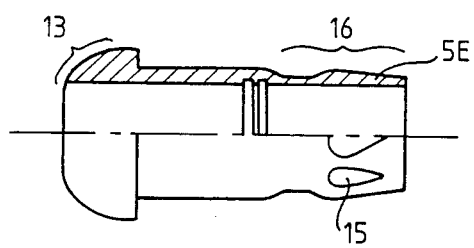
FIG. 7 is a half cross-sectional view of an accessory according to the invention which is mechanically machined to obtain a dismountable hardened connecting portion.

In the form of embodiment shown in FIG. 7 the accessory according to the invention is entirely machined from a malleable material which may be 316L. The sealing zone (13) of the dismountable connection is obtained by hardening such zone through cold working by rollers. The malleable crimping portion (5E) therefore extends up to under such hardened sealing zone (13).

Figure 8:
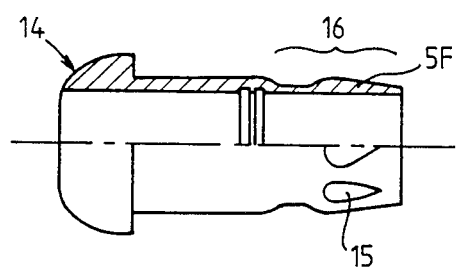
FIG. 8 is a half cross-sectional view of an accessory according to the invention which is electrolytically treated with a view to obtaining a dismountable hardened connecting portion.

In the form of embodiment shown in FIG. 8 the accessory in accordance with the invention is also entirely machined from overquenched 316L or similar material, the hardening of a sealing zone (14) of dismountable connecting being obtained by electrolytic deposition (hard chromium plating), the malleable crimping portion (5F) therefore extends here too up to under the hard sealing zone (14).

It is also considered according to the invention to combine the above-described solutions and for example the outer cold working (FIG. 7) and the inner reinforcing (FIG. 6).

In a first step the accessory can be entirely machined from a stainless steel of the structural hardening type (for example, Z6NCT25) previously aged to confer maximum hardness. The accessory is thereafter submitted to overquenching through high frequency induction, localized to portion (5).

In the case of Z6NCT25 such overquenching lowers the elastic limit to 0.2% (RO, 2) from about 750 MPa to about 250 MPa.

After treatment the accessory comprises the malleable crimping portion (5) and the harder dismountable connecting portion (6).

It must be noted that the hard adventitious portion (6, 6A, 6B, 9, 11, 13, 14) whatever be its mode of manufacture is always configured so as to realize a spherical, toroidal or conical male member, of dismountable connecting device and that the malleable portion of crimping connection (5, 5A, 5B, 5C, 5D, 5E, 5F) comprises at least one zone (16) intended for being radially crimped into the pipe end, and means for preventing rotation of the connection with respect to the pipe on which it is definitely crimped. The means for preventing rotation of the connection may consists of flat portions (15) or else, an inner rib which can be a helical rib.

The accessory according to the invention is applied more particularly to the aeronautic field but can also be applied to other fields such as for example vessels or offshore platforms.

Finally, it will be understood that this invention was only described and represented in a preferred exemplifying way and that any equivalent parts can be substituted for its constitutive elements without however departing from its scope.

I claim:

1. A crimping connecting accessory for connecting rigid pipings, comprising an unthreaded sleeve having:
   a tail section including a first malleable portion for a first connection of the radial crimping type onto the outer periphery of an end of a first pipe; and
   a head section including a second portion of higher hardness than said first malleable portion for a second connection of the dismountable type into a female member attached to an outer periphery of an end of a second pipe, said head section being of a larger diameter than said tail section, said tail section and said head section being joined to one another to form a single metal piece, wherein:
   said first malleable portion comprises at least one zone for radial crimping onto an end piping and means for preventing said malleable portion from rotating with respect to said pipe on which it is crimped.

2. A crimping connecting accessory for connecting rigid pipings, comprising an unthreaded sleeve having:
   a tail section including a first malleable portion for a first connection of the radial crimping type onto the outer periphery of an end of a first pipe; and
   a head section including a second portion of higher hardness than said first malleable portion for a second connection of the dismountable type into a female member attached to an outer periphery of an end of a second pipe, said head section being of a larger diameter than said tail section, said tail section and said head section being joined to one another to form a single metal piece, wherein:
   said head section defines a sealing zone having a second malleable portion; and
   said second malleable portion defines a lateral convex surface, a member of hard material, distinct from said lateral concave surface, being fixed onto said lateral convex surface of said second malleable portion.

3. A crimping connecting accessory for connecting rigid pipings, comprising an unthreaded sleeve having:
   a tail section including a first malleable portion for a first connection of the radial crimping type onto the outer periphery of an end of a first pipe; and
   a head section including a second portion of higher hardness than said first malleable portion for a second connection of the dismountable type into a female member attached to an outer periphery of an end of a second pipe, said head section being of a larger diameter than said tail section, said tail section and said head section being joined to one another to form a single metal piece, wherein:

an annular groove is outwardly formed in said first malleable portion, a reamed spherical segment of hard material being received and fixed in said annular groove.

4. A crimping connecting accessory for connecting rigid pipings, comprising an unthreaded sleeve having:
   a tail section including a first malleable portion for a first connection of the radial crimping type onto the outer periphery of an end of a first pipe; and
   a head section including a second portion of higher hardness than said first malleable portion for second connection of the dismountable type into a female member attached to an outer periphery of an end of a second pipe, said head section being of a larger diameter than said tail section, said tail section and said head section being joined to one another to form a single metal piece, wherein:
   said head and said tail sections are formed with complementary assembling collars, said collars defining surfaces along which said complementary assembling collars are fixed to one another.

5. A crimping connecting accessory for connecting rigid pipings, comprising an unthreaded sleeve having:
   a tail section including a first malleable portion for a first connection of the radial crimping type onto the outer periphery of an end of a first pipe; and
   a head section including a second portion of higher hardness than said first malleable portion for a second connection of the dismountable type into a female member attached to an outer periphery of an end of a second pipe, said head section being of a larger diameter than said tail section, said tail section and said head section being joined to one another to form a single metal piece, wherein:
   said first malleable portion is monolithic with said second portion of higher hardness and is developed on said accessory which is originally entirely hard.

6. A crimping connecting accessory for connecting rigid pipings, comprising an unthreaded sleeve having:
   a tail section including a first malleable portion for a first connection of the radial crimping type onto the outer periphery of an end of a first pipe; and
   a head section including a second portion of higher hardness than said first malleable portion for a second connection of the dismountable type into a female member attached to an outer periphery of an end of a second pipe, said head section being of a larger diameter than said tail section, said tail section and said head section being joined to one another to form a single metal piece, wherein:
   said first malleable portion is monolithic with said second portion of higher hardness and is obtained on said accessory by localized overquenching a zone within said head section, which lowers the elastic limit in said zone of the accessory.

7. A pipe coupling element for connecting rigid pipes, comprising:
   a first end portion and a second end portion, said first end portion being connected to said second end portion and being integral therewith, said first end portion comprising a malleable material and thereby constituting means for forming a first connection of the radial crimping type onto an outer periphery of an end of a first pipe, said second end portion comprising a material having a higher hardness than said malleable material, said second end portion having a male element and constituting means for providing a second connection of the dismountable type into a female member attached to an outer periphery of an end of a second pipe, said higher hardness material imparting to said male element sufficient rigidity to prevent collapse thereof when said second end portion is subjected to use as said second connection of the dismountable type, wherein:
   said malleable material is monolithic with said higher hardness material and is obtained by localized overquenching.

* * * * *